(12) United States Patent
Sevastiyanov et al.

(10) Patent No.: US 9,286,119 B2
(45) Date of Patent: Mar. 15, 2016

(54) SYSTEM, METHOD, AND COMPUTER PROGRAM PRODUCT FOR MANAGEMENT OF DEPENDENCY BETWEEN TASKS

(71) Applicant: NVIDIA Corporation, Santa Clara, CA (US)

(72) Inventors: Igor Sevastiyanov, San Jose, CA (US); Brian Matthew Fahs, San Jose, CA (US); Nicholas Wang, Saratoga, CA (US); Scott Ricketts, San Francisco, CA (US); Luke David Durant, Santa Clara, CA (US); Brian Scott Pharris, Cary, NC (US)

(73) Assignee: NVIDIA Corporation, Santa Clara, CA (US)

( * ) Notice: Subject to any disclaimer, the term of this patent is extended or adjusted under 35 U.S.C. 154(b) by 267 days.

(21) Appl. No.: 13/766,595

(22) Filed: Feb. 13, 2013

(65) Prior Publication Data
US 2014/0229953 A1    Aug. 14, 2014

(51) Int. Cl.
*G06F 9/46* (2006.01)
*G06F 9/48* (2006.01)

(52) U.S. Cl.
CPC ........ *G06F 9/4881* (2013.01); *G06F 2209/484* (2013.01)

(58) Field of Classification Search
CPC .................................................. G06F 9/4881
See application file for complete search history.

(56) References Cited

U.S. PATENT DOCUMENTS

| | | | | |
|---|---|---|---|---|
| 7,539,988 | B1 * | 5/2009 | Hersh | 718/100 |
| 2002/0138679 | A1 * | 9/2002 | Koning et al. | 710/244 |
| 2009/0002379 | A1 | 1/2009 | Baeza et al. | |
| 2009/0323820 | A1 | 12/2009 | Wu et al. | |
| 2014/0143519 | A1 * | 5/2014 | Heidelberger et al. | 711/214 |
| 2014/0337389 | A1 | 11/2014 | Ricketts et al. | |

OTHER PUBLICATIONS

Non-Final Office Action from U.S. Appl. No. 13/890,184, dated Jun. 11, 2015.
Non-Final Office Action from U.S. Appl. No. 13/890,184, dated Feb. 10, 2015.

* cited by examiner

*Primary Examiner* — Camquy Truong
(74) *Attorney, Agent, or Firm* — Zilka-Kotab, PC (57) ABSTRACT

A system, method, and computer program product for management of dynamic task-dependency graphs. The method includes the steps of generating a first task data structure in a memory for a first task, generating a second task data structure in the memory, storing a pointer to the second task data structure in a first output dependence field of the first task data structure, setting a reference counter field of the second task data structure to a threshold value that indicates a number of dependent events associated with the second task, and launching the second task when the reference counter field stores a particular value. The second task data structure is a placeholder for a second task that is dependent on the first task.

20 Claims, 10 Drawing Sheets

SYSTEM, METHOD, AND COMPUTER PROGRAM PRODUCT FOR MANAGEMENT OF DEPENDENCY BETWEEN TASKS

FIELD OF THE INVENTION

The present invention relates to task management, and more particularly to management of dependency between tasks.

BACKGROUND

Modern operating systems enable various processors to be multi-tasking processors. In other words, two or more tasks can be executed substantially simultaneously. Typically, the operating system implements a task scheduling kernel that manages which tasks are executed by the processor. The priority scheduling algorithm may implement round-robin scheduling, fixed priority pre-emptive scheduling, or other types of scheduling algorithms well-known in the art. Conventionally, the scheduling algorithm is implemented via task objects (i.e., data structures) that are managed by a software kernel. Many operating systems implement a process priority with each process currently active within the operating system. For example, Microsoft Windows assigns one of 32 priority levels to each launched process, and a task manager kernel implements a multi-level feedback queue to manage the scheduling of the active processes for execution.

Many modern processors implement hardware based scheduling units that enable multiple tasks to be queued in hardware and dispatched for execution based on a particular scheduling algorithm implemented by the scheduling unit. However, in most systems, prioritizing processes for execution is still managed by software running in the background. For example, a hardware scheduling unit may be configured to execute whichever process has the highest priority. However, a software kernel is configured to adjust the priority level of each process to ensure that each process is allowed to execute and that dependent processes are executed in the correct order.

It will be appreciated that latency is introduced by the management of scheduling priority in software. The task scheduling kernel must be executed periodically to update priority levels in order to adjust which processes are being executed by the processor. In addition, by including software management of priority levels, the hardware scheduling unit must repeatedly make memory access requests to update priority levels of the different tasks. This latency creates a bottleneck that slows down the efficiency of the processor. Thus, there is a need for addressing this issue and/or other issues associated with the prior art.

SUMMARY

A system, method, and computer program product for management of dynamic task-dependency graphs. The method includes the steps of generating a first task data structure in a memory for a first task, generating a second task data structure in the memory, storing a pointer to the second task data structure in a first output dependence field of the first task data structure, setting a reference counter field of the second task data structure to a threshold value that indicates a number of dependent events associated with the second task, and launching the second task when the reference counter field stores a particular value. The second task data structure is a placeholder for a second task that is dependent on the first task.

DETAILED DESCRIPTION

A hardware scheduling mechanism for a multi-threaded processor is described below. The hardware scheduling mechanism provides a means to implement a variety of different parallelization techniques such as scheduling streams and events. The hardware scheduling mechanism implements a dynamic task-dependency graph that includes a plurality of task data structures implemented as a linked list for each stream of tasks executed by the processor. Each task in a stream is launched when a reference counter reaches a trigger value, such as zero. The tasks in each stream may be generated remotely by a central processing unit that generates tasks in memory and then sends a link to the task to the processor or the tasks in each stream may be generated locally by threads executing in the processor. The streams each include a placeholder data structure that reserves a place in the stream for new tasks to be added to the stream. Each task in a stream is only launched once software has generated the task associated with the task data structure and when one or more predecessor tasks in the stream have finished executing. Synchronization between streams may be implemented by creating dependencies for a task in one stream to an event executed by another stream. The dependent task will not be executed until the occurrence of the event in the other stream.

Figure 1:
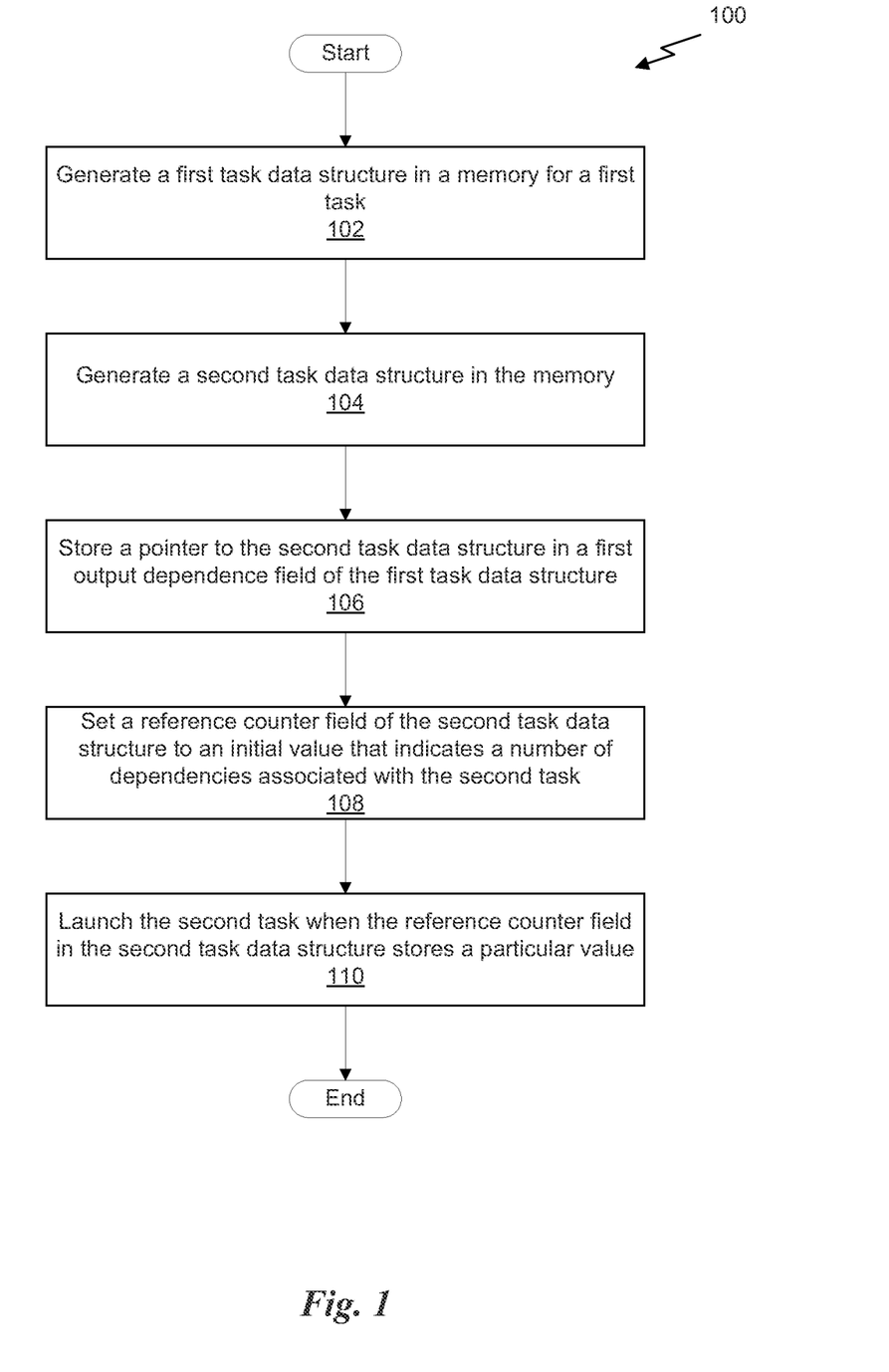
FIG. 1 illustrates a flowchart of a method for managing task dependency graphs, in accordance with one embodiment.

FIG. 1 illustrates a flowchart of a method 100 for managing task dependency graphs, in accordance with one embodiment. At step 102, a first task data structure is generated in a memory for a first task. In one embodiment, a task data structure includes one or more fields including a reference counter field that stores a value indicating the number of dependencies for the task and one or more output dependence pointer fields that store pointers to other task data structures that are dependent on completion of the task. At step 104, a second task data structure is generated in the memory. The second task data structure is a placeholder for a second task that is dependent on the first task. The second task data structure may be generated before the software has generated the second task.

At step 106, a pointer to the second task data structure is stored in a first output dependence field of the first task data structure. The pointer indicates that the reference counter field of the second task data structure should be decremented when execution of the first task has completed. At step 108, a reference counter field of the second task data structure is set to an initial value that indicates a number of input dependencies associated with the second task. In one embodiment, the reference counter for the second task data structure is initialized to two, indicating that two dependencies are associated with the second task. The second task data structure is dependent on software to generate the second task in the memory. The second task data structure is also dependent on the completed execution of the first task. In some embodiments, the second task data structure may include additional dependencies such as dependencies related to the occurrence of events in another stream.

At step 110, the second task is launched when the reference counter field in the second task data structure stores a particular value. In one embodiment, tasks are launched when the reference counter field in the task data structure for the task reaches zero. The reference counter field is decremented by software when the task associated with the task data structure is stored in memory (i.e., when software is done generating the task) and when any predecessor tasks that store a pointer to the task data structure in one of the predecessor task's output dependence field has completed execution.

It should be noted that, while various optional features are set forth herein in connection with managing dynamic task-dependency graphs, such features are for illustrative purposes only and should not be construed as limiting in any manner. In one embodiment, the scheduling mechanism described above is implemented in a parallel processing unit.

Figure 2:
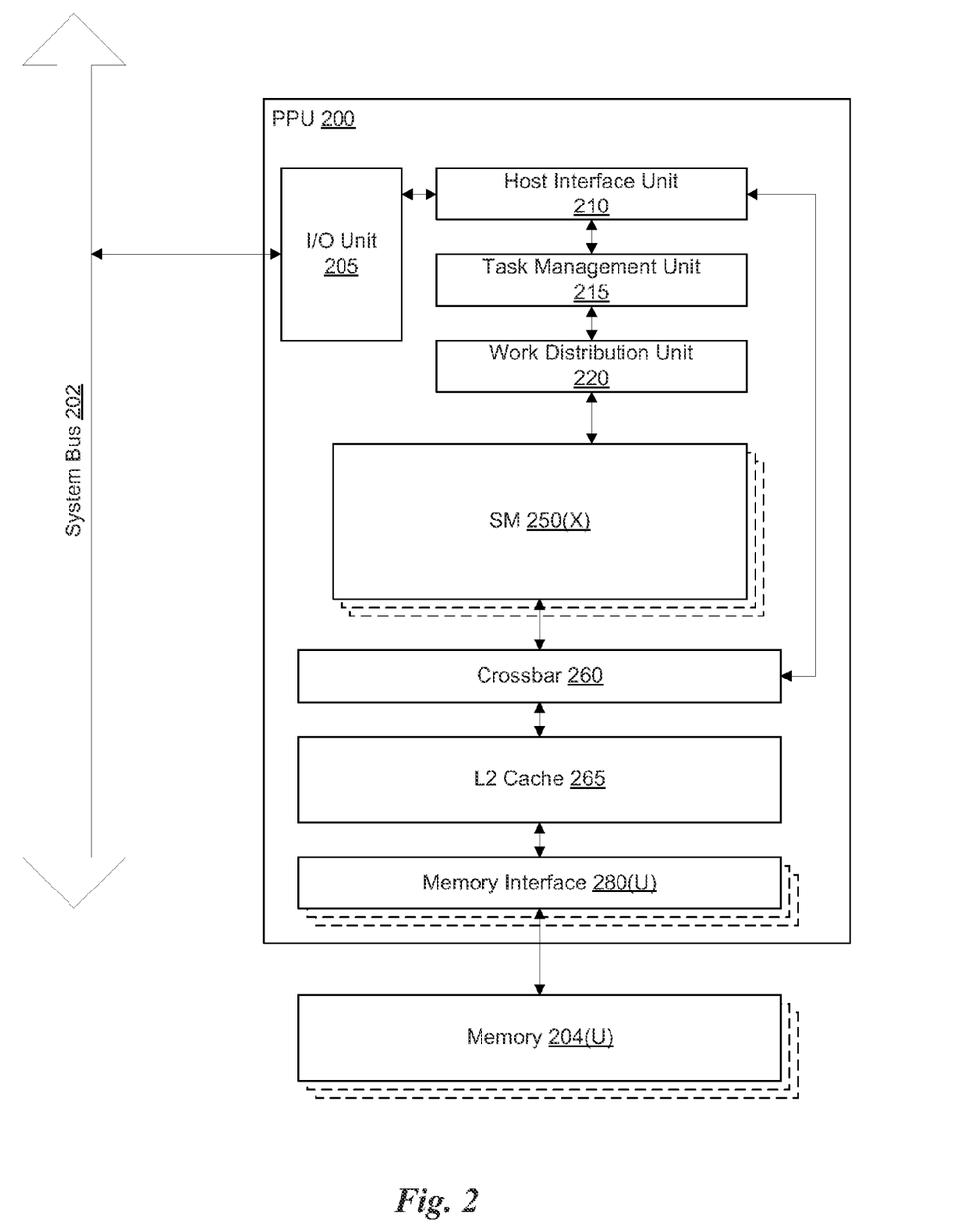
FIG. 2 illustrates a parallel processing unit, according to one embodiment.

FIG. 2 illustrates a parallel processing unit (PPU) 200, according to one embodiment. While a parallel processor is provided herein as an example of the PPU 200, it should be strongly noted that such processor is set forth for illustrative purposes only, and any processor may be employed to supplement and/or substitute for the same. In one embodiment, the PPU 200 is configured to execute a plurality of threads concurrently in two or more streaming multi-processors (SMs) 250. A thread (i.e., a thread of execution) is an instantiation of a set of instructions executing within a particular SM 250. Each SM 250, described below in more detail in conjunction with FIG. 3, may include, but is not limited to, one or more processing cores, one or more load/store units (LSUs), a level-one (L1) cache, shared memory, and the like.

In one embodiment, the PPU 200 includes an input/output (I/O) unit 205 configured to transmit and receive communications (i.e., commands, data, etc.) from a central processing unit (CPU) (not shown) over the system bus 202. The I/O unit 205 may implement a Peripheral Component Interconnect Express (PCIe) interface for communications over a PCIe bus. In alternative embodiments, the I/O unit 205 may implement other types of well-known bus interfaces.

The PPU 200 also includes a host interface unit 210 that decodes the commands and transmits the commands to the task management unit 215 or other units of the PPU 200 (e.g., memory interface 280) as the commands may specify. The host interface unit 210 is configured to route communications between and among the various logical units of the PPU 200.

In one embodiment, a program encoded as a command stream is written to a buffer by the CPU. The buffer is a region in memory, e.g., memory 204 or system memory, that is accessible (i.e., read/write) by both the CPU and the PPU 200. The CPU writes the command stream to the buffer and then transmits a pointer to the start of the command stream to the PPU 200. The host interface unit 210 provides the task management unit (TMU) 215 with pointers to one or more streams. The TMU 215 selects one or more streams and is configured to organize the selected streams as a pool of pending grids. The pool of pending grids may include new grids that have not yet been selected for execution and grids that have been partially executed and have been suspended.

A work distribution unit 220 that is coupled between the TMU 215 and the SMs 250 manages a pool of active grids, selecting and dispatching active grids for execution by the SMs 250. Pending grids are transferred to the active grid pool by the TMU 215 when a pending grid is eligible to execute, i.e., has no unresolved data dependencies. An active grid is transferred to the pending pool when execution of the active grid is blocked by a dependency. When execution of a grid is completed, the grid is removed from the active grid pool by the work distribution unit 220. In addition to receiving grids from the host interface unit 210 and the work distribution unit 220, the TMU 215 also receives grids that are dynamically generated by the SMs 250 during execution of a grid. These dynamically generated grids join the other pending grids in the pending grid pool.

In one embodiment, the CPU executes a driver kernel that implements an application programming interface (API) that enables one or more applications executing on the CPU to schedule operations for execution on the PPU 200. An application may include instructions (i.e., API calls) that cause the driver kernel to generate one or more grids for execution. In one embodiment, the PPU 200 implements a SIMD (Single-Instruction, Multiple-Data) architecture where each thread block (i.e., warp) in a grid is concurrently executed on a different data set by different threads in the thread block. The driver kernel defines thread blocks that are comprised of k related threads, such that threads in the same thread block may exchange data through shared memory. In one embodiment, a thread block comprises 32 related threads and a grid is an array of one or more thread blocks that execute the same stream and the different thread blocks may exchange data through global memory.

In one embodiment, the PPU 200 comprises X SMs 250 (X). For example, the PPU 200 may include 15 distinct SMs 250. Each SM 250 is multi-threaded and configured to execute a plurality of threads (e.g., 32 threads) from a particular thread block concurrently. Each of the SMs 250 is connected to a level-two (L2) cache 265 via a crossbar 260 (or other type of interconnect network). The L2 cache 265 is connected to one or more memory interfaces 280. Memory interfaces 280 implement 16, 32, 64, 128-bit data buses, or the like, for high-speed data transfer. In one embodiment, the PPU 200 comprises U memory interfaces 280(U), where each memory interface 280(U) is connected to a corresponding memory device 204(U). For example, PPU 200 may be connected to up to 6 memory devices 204, such as graphics double-data-rate, version 5, synchronous dynamic random access memory (GDDR5 SDRAM).

In one embodiment, the PPU 200 implements a multi-level memory hierarchy. The memory 204 is located off-chip in SDRAM coupled to the PPU 200. Data from the memory 204 may be fetched and stored in the L2 cache 265, which is located on-chip and is shared between the various SMs 250. In one embodiment, each of the SMs 250 also implements an L1 cache. The L1 cache is private memory that is dedicated to a particular SM 250. Each of the L1 caches is coupled to the shared L2 cache 265. Data from the L2 cache 265 may be fetched and stored in each of the L1 caches for processing in the functional units of the SMs 250.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display). The driver kernel implements a graphics processing pipeline, such as the graphics processing pipeline defined by the OpenGL API.

An application writes model data for a scene (i.e., a collection of vertices and attributes) to memory. The model data defines each of the objects that may be visible on a display. The application then makes an API call to the driver kernel that requests the model data to be rendered and displayed. The driver kernel reads the model data and writes commands to the buffer to perform one or more operations to process the model data. The commands may encode different shader programs including one or more of a vertex shader, hull shader, geometry shader, pixel shader, etc. For example, the TMU 215 may configure one or more SMs 250 to execute a vertex shader program that processes a number of vertices defined by the model data. In one embodiment, the TMU 215 may configure different SMs 250 to execute different shader programs concurrently. For example, a first subset of SMs 250 may be configured to execute a vertex shader program while a second subset of SMs 250 may be configured to execute a pixel shader program. The first subset of SMs 250 processes vertex data to produce processed vertex data and writes the processed vertex data to the L2 cache 265 and/or the memory 204. After the processed vertex data is rasterized (i.e., transformed from three-dimensional data into two-dimensional data in screen space) to produce fragment data, the second subset of SMs 250 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Figure 3:
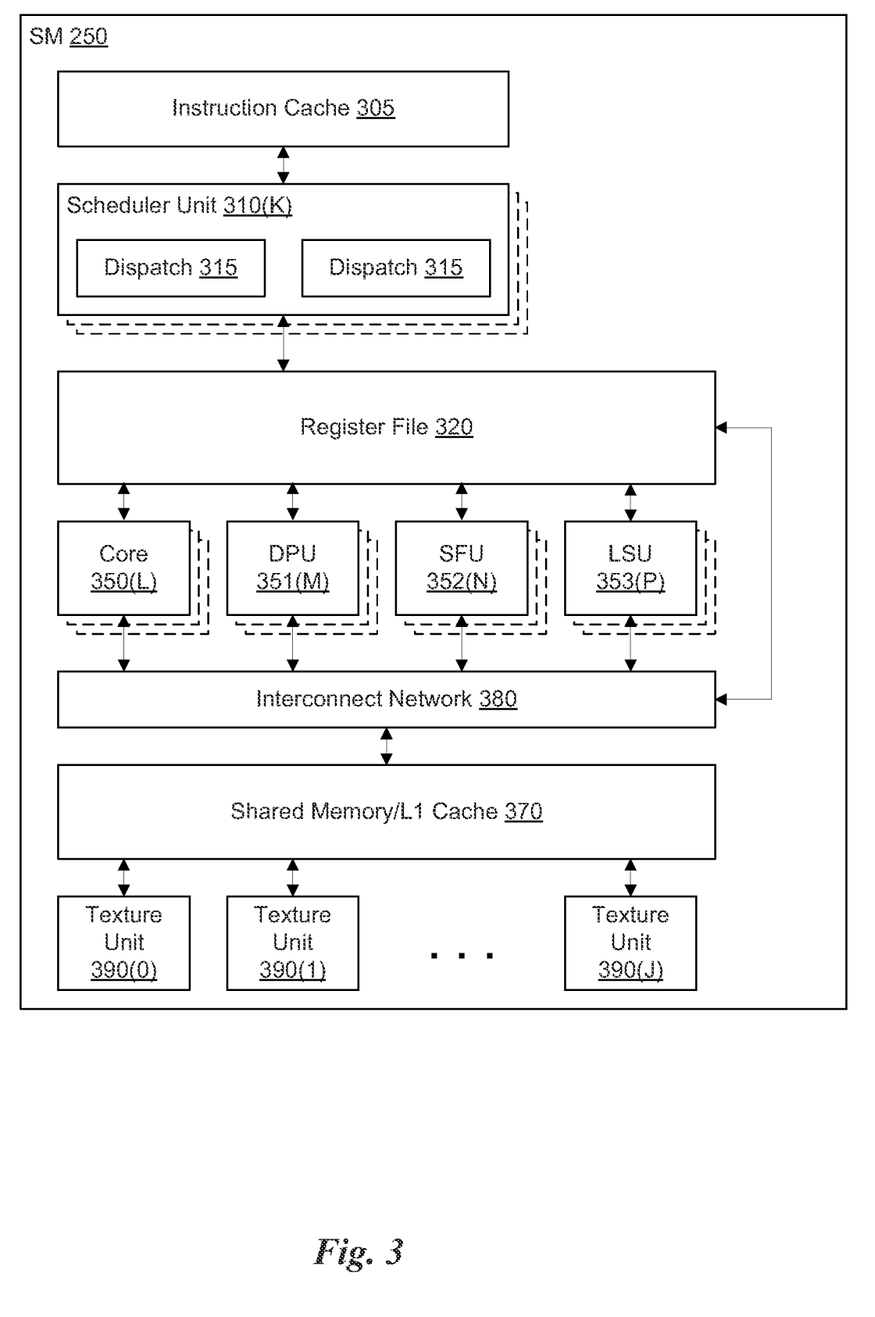
FIG. 3 illustrates the streaming multi-processor of FIG. 2, according to one embodiment.

FIG. 3 illustrates the streaming multi-processor 250 of FIG. 2, according to one embodiment. As shown in FIG. 3, the SM 250 includes an instruction cache 305, one or more scheduler units 310, a register file 320, one or more processing cores 350, one or more double precision units (DPUs) 351, one or more special function units (SFUs) 352, one or more load/store units (LSUs) 353, an interconnect network 380, a shared memory/L1 cache 370, and one or more texture units 390.

As described above, the work distribution unit 220 dispatches active grids for execution on one or more SMs 250 of the PPU 200. The scheduler unit 310 receives the grids from the work distribution unit 220 and manages instruction scheduling for one or more thread blocks of each active grid. The scheduler unit 310 schedules threads for execution in groups of parallel threads, where each group is called a warp. In one embodiment, each warp includes 32 threads. The scheduler unit 310 may manage a plurality of different thread blocks, allocating the thread blocks to warps for execution and then scheduling instructions from the plurality of different warps on the various functional units (i.e., cores 350, DPUs 351, SFUs 352, and LSUs 353) during each clock cycle.

In one embodiment, each scheduler unit 310 includes one or more instruction dispatch units 315. Each dispatch unit 315 is configured to transmit instructions to one or more of the functional units. In the embodiment shown in FIG. 3, the scheduler unit 310 includes two dispatch units 315 that enable two different instructions from the same warp to be dispatched during each clock cycle. In alternative embodiments, each scheduler unit 310 may include a single dispatch unit 315 or additional dispatch units 315.

Each SM 250 includes a register file 320 that provides a set of registers for the functional units of the SM 250. In one embodiment, the register file 320 is divided between each of the functional units such that each functional unit is allocated a dedicated portion of the register file 320. In another embodiment, the register file 320 is divided between the different warps being executed by the SM 250. The register file 320 provides temporary storage for operands connected to the data paths of the functional units.

Each SM 250 comprises L processing cores 350. In one embodiment, the SM 250 includes a large number (e.g., 192, etc.) of distinct processing cores 350. Each core 350 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 250 also comprises M DPUs 351 that implement double-precision floating point arithmetic, N SFUs 352 that perform special functions (e.g., copy rectangle, pixel blending operations, and the like), and P LSUs 353 that implement load and store operations between the shared memory/L1 cache 370 and the register file 320. In one embodiment, the SM 250 includes 64 DPUs 351, 32 SFUs 352, and 32 LSUs 353.

Each SM 250 includes an interconnect network 380 that connects each of the functional units to the register file 320 and the shared memory/L1 cache 370. In one embodiment, the interconnect network 380 is a crossbar that can be configured to connect any of the functional units to any of the registers in the register file 320 or the memory locations in shared memory/L1 cache 370.

In one embodiment, the SM 250 is implemented within a GPU. In such an embodiment, the SM 250 comprises J texture units 390. The texture units 390 are configured to load texture maps (i.e., a 2D array of texels) from the memory 204 and sample the texture maps to produce sampled texture values for use in shader programs. The texture units 390 implement texture operations such as anti-aliasing operations using mip-maps (i.e., texture maps of varying levels of detail). In one embodiment, the SM 250 includes 16 texture units 390.

The PPU 200 described above may be configured to perform highly parallel computations much faster than conventional CPUs. Parallel computing has advantages in graphics processing, data compression, biometrics, stream processing algorithms, and the like.

Task Management Unit

Figure 4:
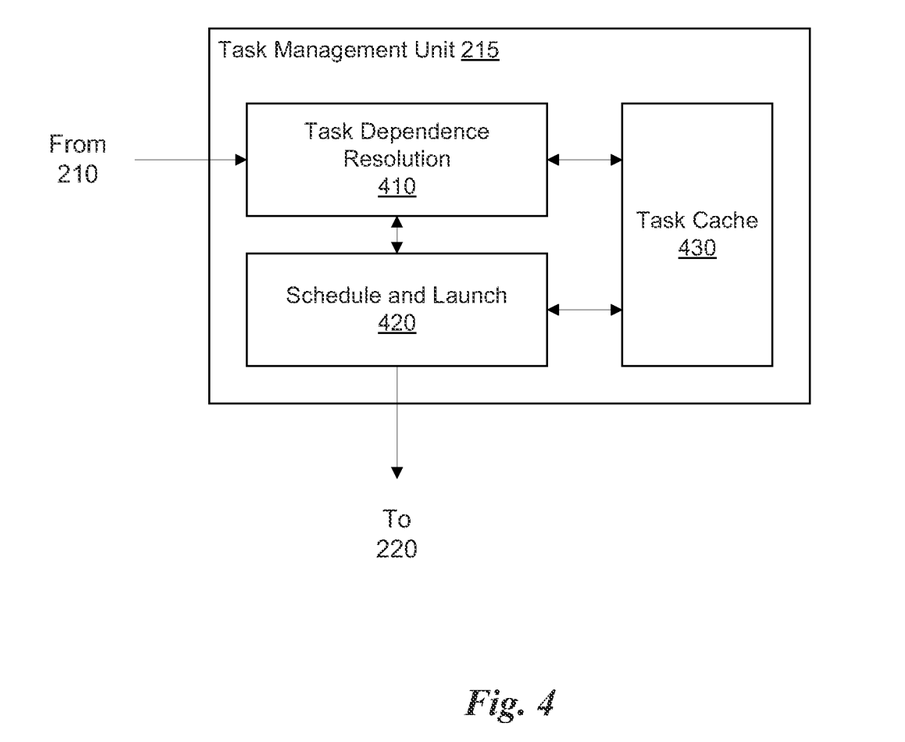
FIG. 4 illustrates the task management unit of FIG. 2, in accordance with one embodiment.

FIG. 4 illustrates the TMU 215 of FIG. 2, in accordance with one embodiment. As shown in FIG. 4, the TMU 215 includes a task-dependence resolution (TDR) unit 410, a schedule and launch (SL) unit 420, and a task cache unit 430. In one embodiment, a task can be launched in one of two ways. The driver kernel executing on a CPU can launch tasks remotely by generating a task (i.e., task meta-data or TMD) in memory 204 and then transmitting a pointer to the TMD to the host interface unit 210. Alternatively, tasks executing on the PPU 200 can launch child tasks locally by generating a TMD in memory 204 and transmitting a pointer to the TMD to the TMU 215. In one embodiment, tasks may be dependent on the execution of one or more other tasks. The TMU 215 should be configured to track and manage dependency information related to each pending task. In some processor architectures, task dependencies may be managed by semaphores acquired and released by the host interface unit 210. However, managing dependencies in this manner may create unwanted latency as the host unit accesses memory to manage the semaphore mechanisms. Furthermore, in the PPU 200, child tasks generated by threads executing within the SMs 250 may not be transmitted to the host interface unit 210, which would require the TMU 215 to transmit messages to the host interface unit 210 in order to manage dependencies associated with the child tasks, thereby increasing bandwidth between the separate hardware units and adding additional latency. Therefore, the TMU 215 may track dependency information using a dynamically generated task-dependency graph comprising a plurality of scheduler objects 500, described below in conjunction with FIG. 5.

The TDR unit 410 is configured to resolve dependencies. The TDR unit 410 tracks input dependencies (i.e., preceding tasks or events on which the current task is dependent). Once the input dependencies have been resolved, the task may then be sent to the SL unit 420 to be scheduled and launched. The SL unit 420 is configured to schedule available tasks for execution on one of the SMs 250. In one embodiment, the SL unit 420 may schedule tasks based on a priority level associated with the task. The priority level may be stored in a field of the TMD for the task. When a task is received by the SL unit 420, the SL unit 420 readies the task to be passed down the pipe to the WDU 220. The SL unit 420 may fetch task state data, including data specified by the TMD, into the task cache 430. Data may be fetched from memory 204 and temporarily stored in task cache 430. In one embodiment, the SL unit 420 pre-fetches task state data into the task cache 430 when a task is transmitted to the SL unit 420 by the TDR unit 410. In other words, once a task's dependencies have been resolved and the task is ready for scheduling, the SL unit 420 is configured to pre-fetch task state data from memory 204 to prepare for the task to be scheduled and launched. In another embodiment, the TDR unit 410 may fetch task state data into the task cache 430.

Figure 5:
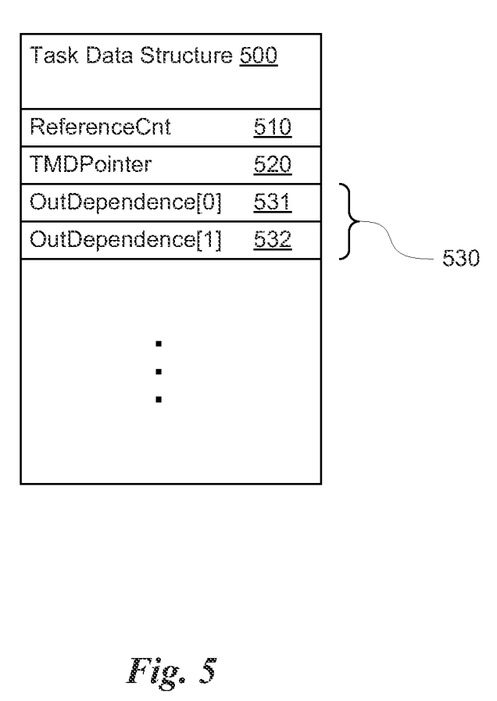
FIG. 5 illustrates a task data structure, in accordance with one embodiment.

FIG. 5 illustrates a task data structure 500, in accordance with one embodiment. The task data structure 500 includes a plurality of fields that include task state information for managing dependencies between tasks. In one embodiment, the task data structure 500 includes a reference counter field 510, ReferenceCnt, which stores a value for a counter that tracks the dependencies for the task associated with the task data structure 500. The task data structure 500 also includes one or more output dependence fields 530 that store pointers to other task data structures 500 associated with tasks that are dependent on current task. As shown in FIG. 5, in one embodiment, the task data structure 500 includes a first output dependence field 531, OutDependence[0], and a second output dependence field 532, OutDependence[1]. When the task associated with the task data structure 500 has completed execution, the TDR unit 410 is configured to decrement the reference counter field 510 for each of that task data structures 500 pointed to by the output dependence fields 530.

In one embodiment, the task data structure 500 includes a TMD pointer field 520, TMDPointer, that stores a pointer to a TMD for the task associated with the task data structure 500. The TMD is a separate data structure that stores the information associated with a task including, but not limited to, a task identifier (i.e., a unique index for the task), a pointer to the location of a program kernel associated with the task, a pointer to the location of data to be processed by the program kernel, and so forth. In another embodiment, various fields of the task data structure 500 may be included within the TMD data structure. For example, the reference counter field 510 and the output dependence fields 530 may be included as additional fields within the TMD data structure rather than having separate data structures for the tasks (i.e., TMDs) and the task state data for managing dependencies between tasks (i.e., scheduler objects 500). In some embodiments, the task data structure 500 may include one or more additional fields, such as a priority level for the tasks, per the desires of the user.

The TDR unit 410 is configured to manage task dependencies by incrementing and decrementing reference counters in each of the tasks and linking dependent tasks using the output dependence fields 530. The TDR unit 410 may manage one or more streams of tasks concurrently. A stream of tasks is an ordered list of tasks where each subsequent task in the stream is dependent on a predecessor task in the stream. When a task in a stream has completed execution (i.e., the TDR unit 410 receives a message from an SM 250 that indicates the SM 250 has completed execution of the task), the TDR unit 410 is configured to follow each of the pointers in the output dependence fields 530 for the completed task and decrement the reference counter fields in each of the dependent tasks.

When a reference counter field 510 associated with a task data structure 500 is equal to a trigger value (e.g., 0), the TDR unit 410 transmits the task associated with the task data structure 500 to the SL unit 420 to be scheduled and launched. The reference counter field 510 enables a task to be dependent on the occurrence of one or more conditions, delaying the launch of the task until each of the conditions has been met. For example, when a task data structure 500 is generated, the task may not have been populated in memory by software. The task may also be dependent on the completed execution of a predecessor task. Thus, when the task data structure 500 is initialized, the reference counter field 510 may be set to an initial value of two to indicate that the task has two dependencies (i.e., software must populate the task in memory and the predecessor task must complete execution).

In addition, tasks may be dependent on additional events. For example, a task in one stream can be synchronized based on the occurrence of an event in another stream. If the event has not occurred, then the dependent task will not be launched by the TMU 215 until the event has occurred. Software may increment the reference counter field 510 for each event that the task is dependent on. For example, in addition to the task being dependent on software populating the task and a predecessor task in the stream completing execution, a task may also be dependent on one or more events being recorded in one or more additional streams executing concurrently in PPU 200. For each additional event that a task is dependent on, software may increment the reference counter field 510 in the task data structure 500 associated with the task.

Figure 6A:
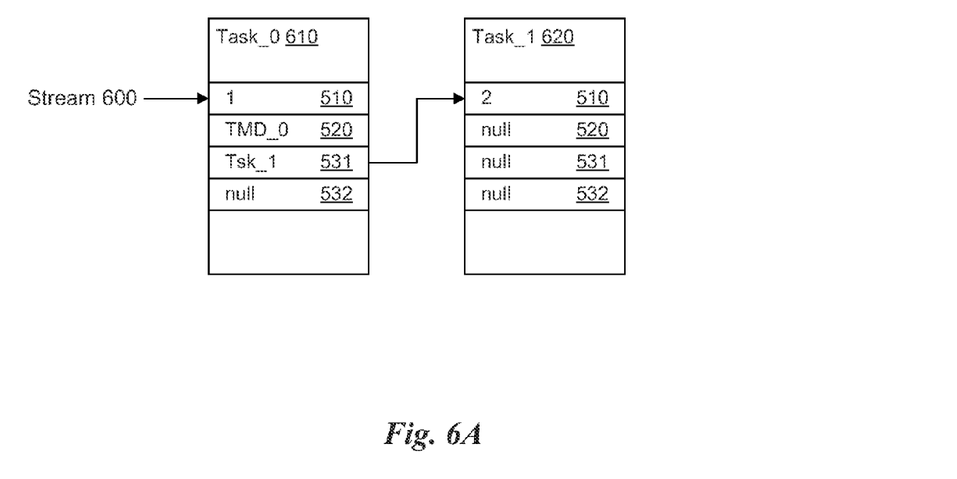
FIG. 6A illustrates a dynamic task-dependency graph for a stream of tasks, in accordance with one embodiment.

FIG. 6A illustrates a dynamic task-dependency graph for a stream 600 of tasks, in accordance with one embodiment. Again, a stream 600 includes a plurality of ordered tasks. Each task in the stream is dependent on a predecessor task and cannot be launched by the SL unit 420 until the predecessor task has completed execution. As shown in FIG. 6A, stream 600 includes a first task data structure 610, Task_0, and a second task data structure 620, Task_1. When the stream 600 is generated, a first task data structure 610 in the stream 600 is generated. A TMD for the first task, TMD_0, is also generated in memory and a pointer to TMD_0 is added to the TMD pointer field 520 of the first task data structure 610. In addition, a second task data structure 620 in the stream 600 is generated as a placeholder for a second task, and a pointer to the second task data structure 620 is added to the first output dependence field 531 of the first task data structure 610. A placeholder task data structure, such as the second task data structure 620, reserves a space in the stream 600 for a task that is yet to be generated by software. As shown in FIG. 6A, the second task data structure 620 has a reference counter field 510 set to two to indicate two dependencies (i.e., software populating Task_1 and the completed execution of Task_0. The TMD pointer field 520 in the second task data structure 620 is null indicating that software has not generated the second task (i.e., TMD_1) in memory yet.

As shown in FIG. 6A, the reference counter field 510 for the first task data structure 610 is one at this time because software has already generated the TMD for the first task and the Task_0 610 is dependent on one predecessor task. Once the predecessor task in the stream 600 has completed execution, the reference counter field 510 for the first task data structure 610 will be decremented to zero and the first task will be scheduled and launched by the SL unit 420. It will be appreciated that if Task_0 610 is the first task in the stream 600, then the reference counter field 510 may be initialized to one and decremented to zero once software has generated the TMD for the first task, thereby allowing the first task to be scheduled and launched by the SL unit 420.

Figure 6B:
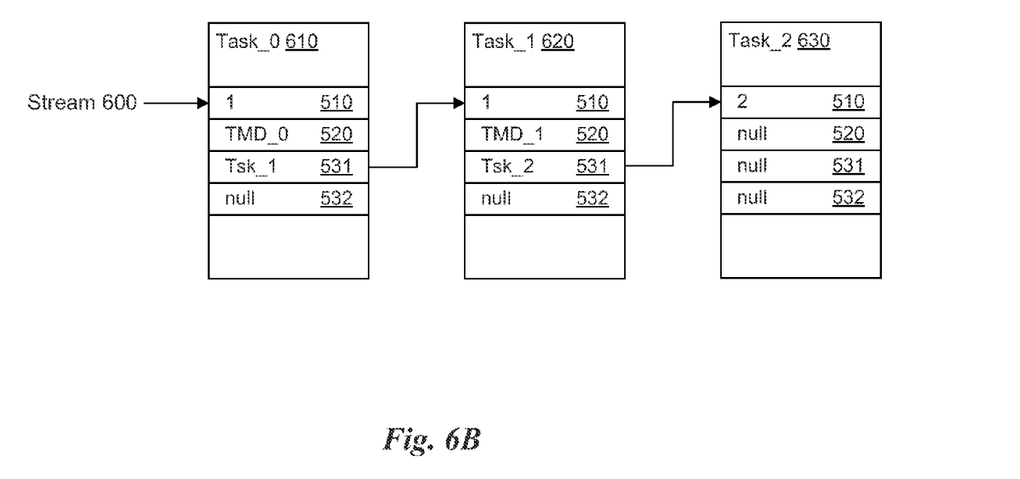
FIG. 6B illustrates adding a task to stream, in accordance with one embodiment.

FIG. 6B illustrates adding a task to stream 600, in accordance with one embodiment. In order to add a task to the stream 600, software may generate a TMD for the second task, TMD_1, in memory and store a pointer to TMD_1 in the TMD pointer field 520 in task_1 620. Once the TMD for the second task has been populated, software decrements the reference counter field 510 of the second task data structure 620 to indicate that the TMD has been completely filled out and is ready for execution once any predecessor tasks have completed execution. Software also generates a new placeholder task data structure 500 for a third task and appends the new placeholder task data structure 500 to the end of the stream. As shown in FIG. 6B, a third task data structure 630 has been generated, and a pointer to the third task data structure 630 is added to the first output dependence field 531 of the second task data structure 620. The new placeholder task data structure, i.e., the third task data structure 630 reserves a space in the stream 600 for the third task that is yet to be generated.

It will be appreciated that the dynamic task-dependency graphs shown in FIGS. 6A and 6B are essentially linked lists that store task state information for different tasks in each entry of the linked list. In some embodiments, PPU 200 may track and manage multiple streams concurrently and the multiple streams may be interdependent. For example, the execution of a task in one stream may depend on the occurrence of an event in another stream. An event mechanism is described below which implements interdependencies among different streams.

Stream Synchronization

Figure 7A:
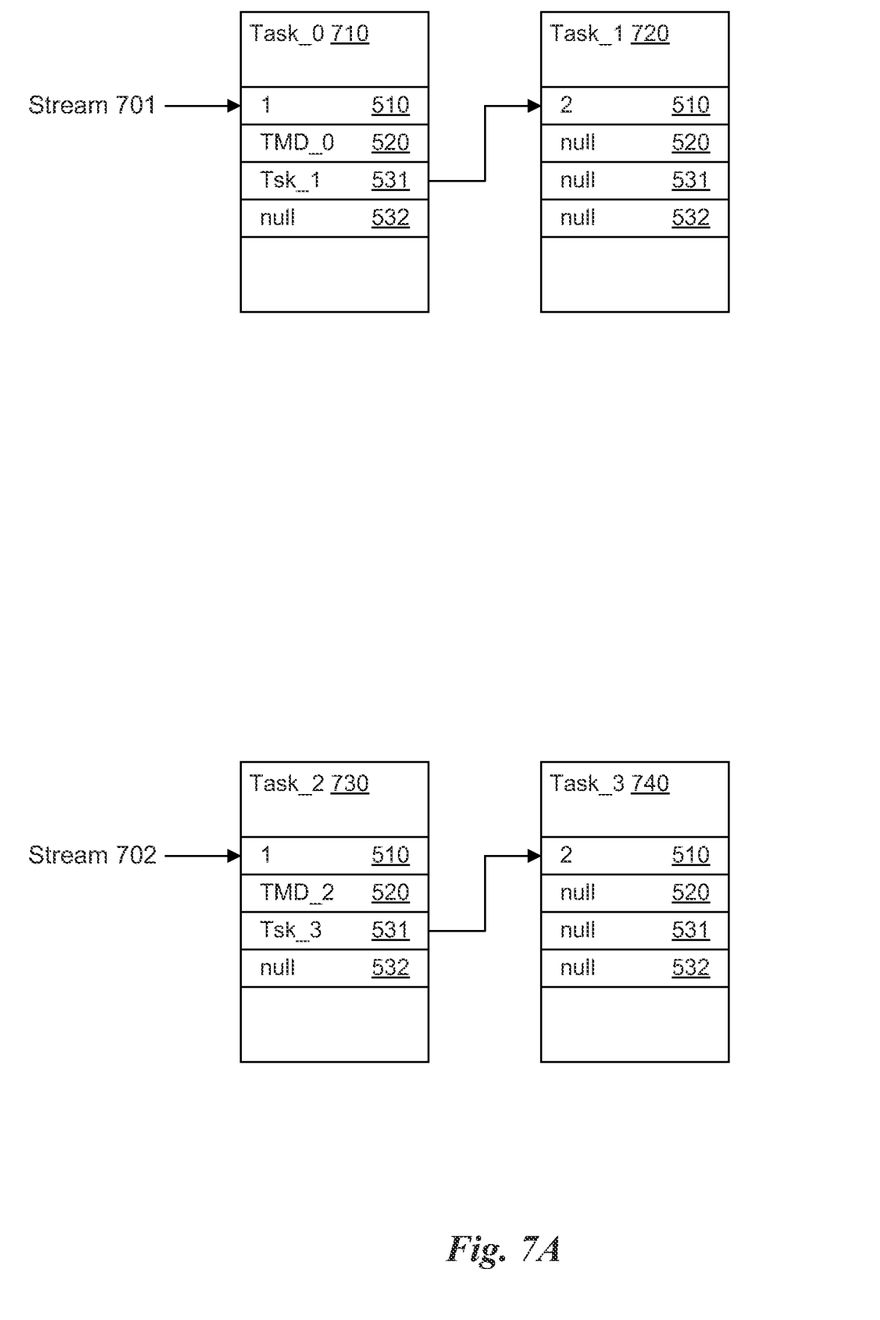
FIGS. 7A through 7C illustrate a technique for managing dependencies between streams, in accordance with one embodiment.
Figure 7B:
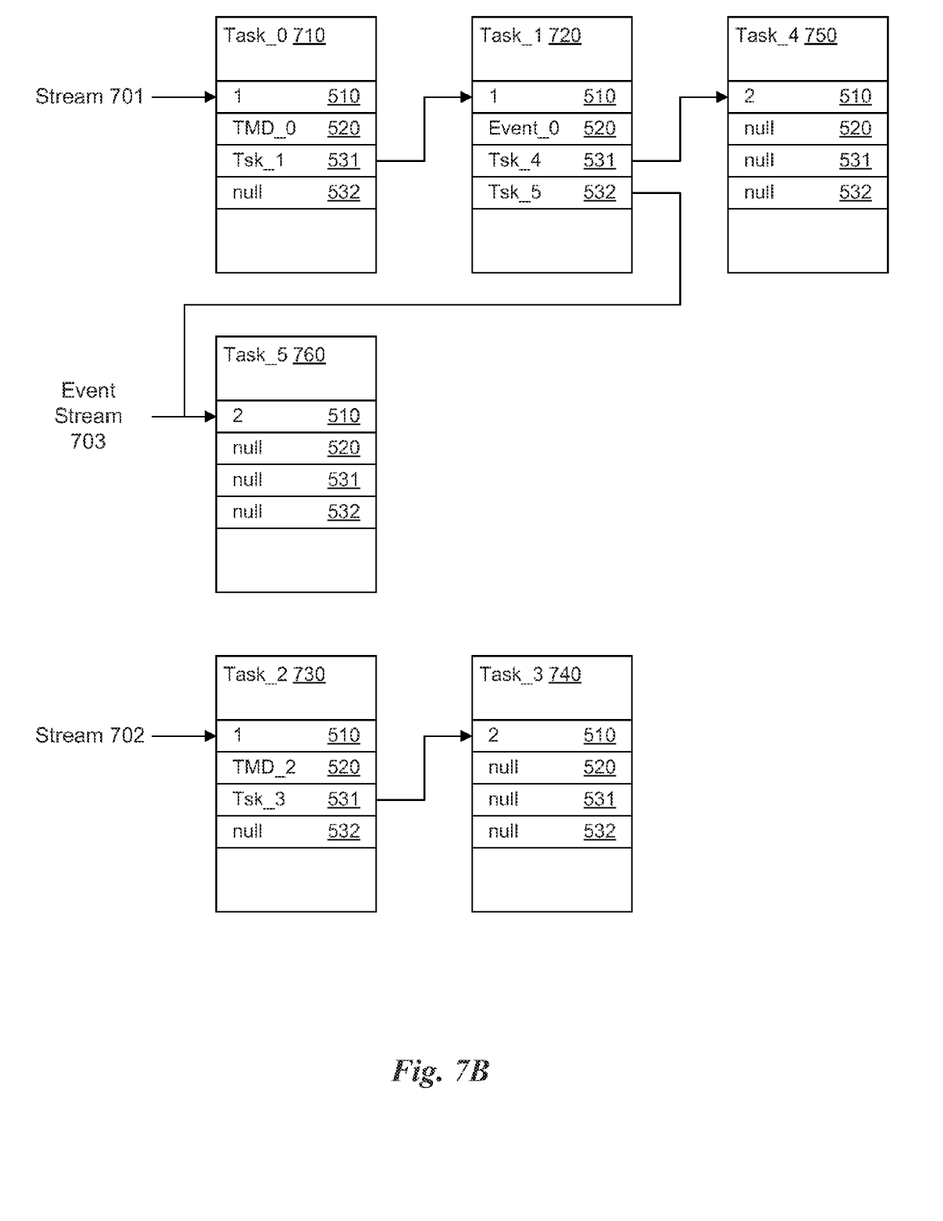
Figure 7C:
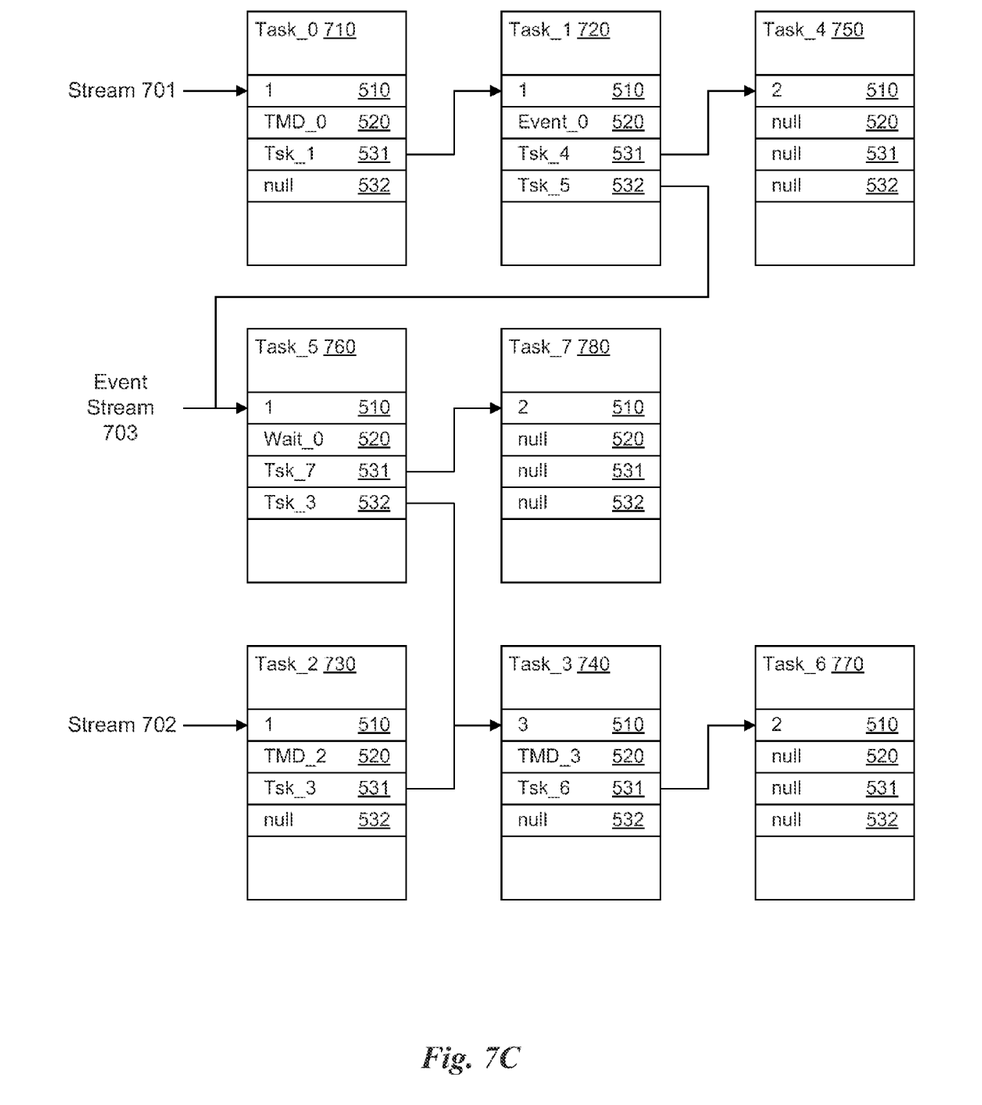

FIGS. 7A through 7C illustrate a technique for managing dependencies between streams, in accordance with one embodiment. Tasks may be synchronized between streams using a mechanism for recording events. An event may be characterized as the completed execution of a special task. A record event is the execution of a special record task within a stream. In order to insert an event within a stream 600, the placeholder task data structure 500 may be associated with the record event. A special event stream is then created that includes one or more wait events for each task that is dependent on the record event. The reference counter fields 510 for the dependent tasks are incremented by one to indicate that the task is dependent on the occurrence of the record event. Tasks are stalled at the TDR unit 410 until the record event has occurred because the reference counter field is not decremented to the trigger value until after the record event has occurred.

As shown in FIG. 7A, a first stream 701 includes a first task data structure 710, Task_0, and a placeholder task data structure 720, Task_1. A pointer to the placeholder task data structure 720 is stored in the first output dependence field 531 of the first task data structure 710. The first task data structure 710 in the first stream 701 includes a pointer to a TMD for the first task in the first stream 701, TMD_0. The reference counter field 510 for the first task data structure 710 has been decremented to one, which indicates that the first task will be ready to launch once a predecessor task has completed execution. Similarly, a second stream 702 includes a first task data structure 730, Task_2, and a placeholder task data structure 740, Task_3. The first task data structure 730 in the second stream 702 includes a pointer to a TMD for the first task in the second stream 702, TMD_2. The reference counter field 510 for the first task data structure 730 has been decremented to one, which indicates that the first task will be ready to launch once a predecessor task has completed execution. FIG. 7A illustrates two concurrently executing streams. As shown in FIG. 7A, the streams are not dependent on each other.

In order to manage dependencies between concurrently executing streams, record events may be added to a stream. As shown in FIG. 7B, a first record event may be added to the placeholder task data structure 720 in stream 701. In one embodiment, a pointer to a record event object, Event_0, may be added to the TMD pointer field 520 in the placeholder task data structure 720. The record event object may be a small kernel of code that is executed by the SM 250 when a record event occurs. In another embodiment, a special value may be stored in the TMD pointer field 520 that indicates that the task is a record event, and no kernel of code is executed for the task. In such cases, the TDR unit 410 does not transmit the task to the SL unit 420 for scheduling and launch. In addition, a new placeholder task data structure 750, Task_4, is added to the end of the first stream 701, and a pointer to the new task data structure 750 is added to the first output dependence field 531 of the record event task data structure 720.

When a record event is added to a stream, an event stream 703 is generated such that one or more additional streams may synchronize upon the occurrence of the record event. When the event stream 703 is generated (i.e., when software adds a record event to a stream), a placeholder task data structure 760, Task_5, is generated and added to the event stream 703. The reference counter field 510 for the placeholder task data structure 760 is initiated to a value of two. In addition, a pointer to the placeholder task data structure 760 is stored in the second output dependence field 532 of the record event task data structure 720. Consequently, after the record event is executed (i.e., the reference counter field 510 in the record event task data structure 720 reaches the trigger value), the reference counter fields for both the new placeholder task data structure 750 and the wait event placeholder task data structure 760 are decremented.

As shown in FIG. 7C, tasks may then be added to other streams which depend on wait events in the event stream 703 that are triggered by the occurrence of the record event in the first stream 701. In order to synchronize a task in a second stream 702 with the occurrence of the record event in the first stream 701, a wait event, Wait_0, is added to the event stream 703 in the wait event placeholder task data structure 760. A task dependent upon the occurrence of the wait event is added to stream 702 in the placeholder task data structure 740, and a new placeholder task data structure 770 is appended to the end of the second stream 702. In addition, a new wait event placeholder task data structure 780 is appended to the end of the event stream 703. A pointer to the new wait event placeholder task data structure 780 is stored in the first output dependence field 531 of the wait event task data structure 760. In addition, a pointer to the dependent task data structure 740 is stored in the second output dependence field 532 of the wait event task data structure 760. The reference counter field 510 of the dependent task is incremented by one to indicate that the task is dependent upon the occurrence of the wait event.

Multiple tasks may be dependent upon the occurrence of the same record event. For each task that is dependent upon the event, a new wait event is appended to the associated event stream 703. Furthermore, a single task may be dependent upon multiple events. For example, Task_3 740 may also be dependent on the occurrence of another event in a third stream (not explicitly shown). In that case, a separate event stream associated with the other record event may be generated and a second wait event task data structure may be pointed to Task_3 740. The reference counter field 510 of Task_3 740 may be incremented again (i.e., from 3 to 4) to indicate that the task is dependent on the other wait event.

In one embodiment, software may implement an application programming interface (API) that can synchronize PPU 200 using different API calls. In one API call, DeviceSync, each stream executing on PPU 200 must finish executing before any additional streams are launched. DeviceSync may be implemented by the host interface unit 210 waiting to receive an idle signal from the TMU 215 that indicates that all pending streams have finished execution. In another API call, StreamSync, software may indicate the end of a stream of execution by generating a null task in the last placeholder task data structure for the stream. When the TDR unit 410 encounters a null task, the TDR unit 410 may reference a semaphore field in the task data structure which stores a pointer to a semaphore location. The TDR unit 410 may then release the semaphore associated with the stream, indicating to the host interface unit 210 that the stream has completed execution. In yet another API call, EventSync, when the TDR unit 410 encounters a record event, the TDR unit 410 may reference a semaphore field in the task data structure which stores a pointer to a semaphore location. The TDR unit 410 may then release the semaphore associated with the event, indicating to the host interface unit 210 that the event has occurred. These three mechanisms allow software executing on the host machine to synchronize with the execution of tasks on the PPU 200. Although semaphores have been implemented as a method of communication between the hardware and software, other techniques may be implemented in lieu of using semaphores. For example, a generic memory operation may be used to transfer information between software executing on a CPU and hardware executing the tasks.

Figure 8:
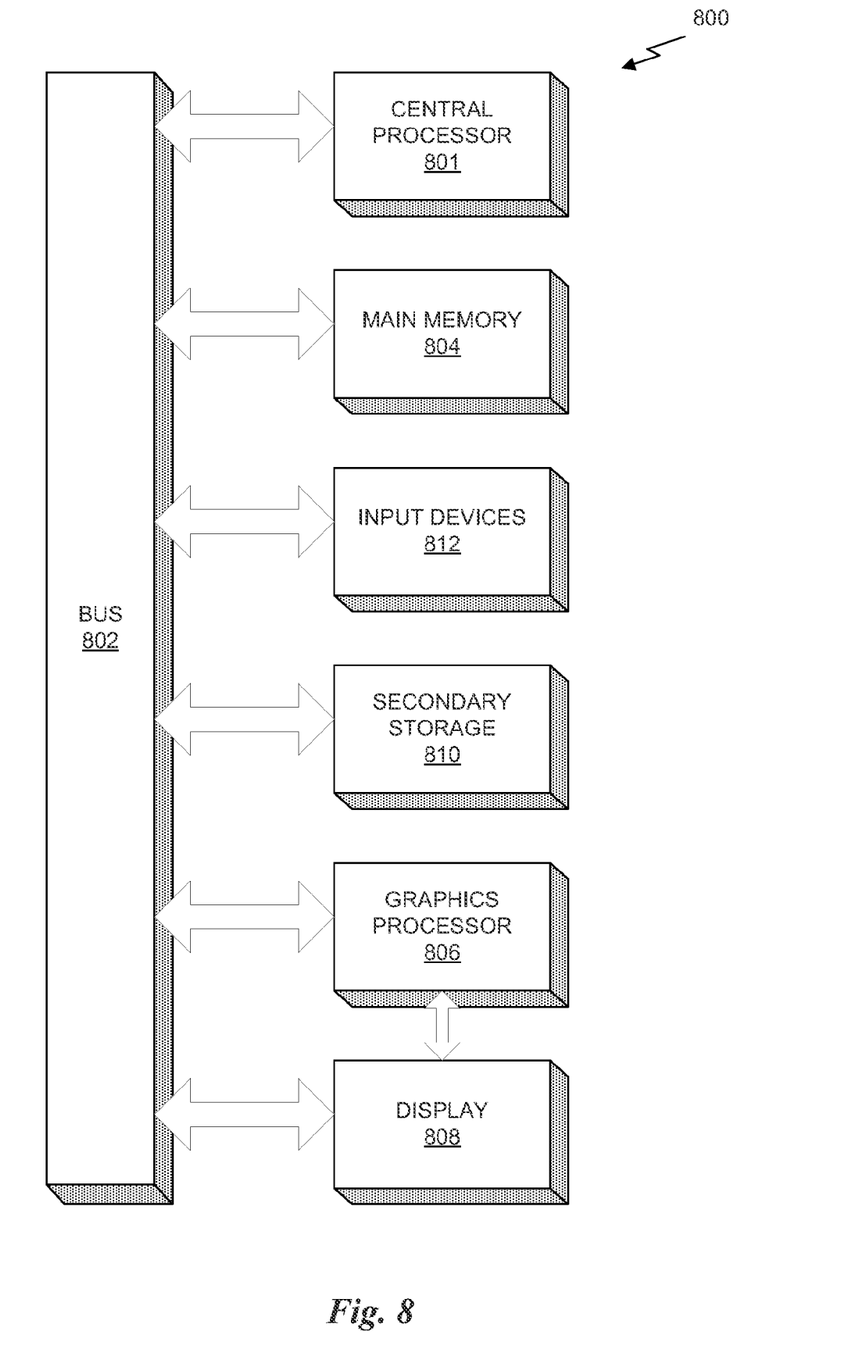
FIG. 8 illustrates an exemplary system in which the various architecture and/or functionality of the various previous embodiments may be implemented.

FIG. 8 illustrates an exemplary system 800 in which the various architecture and/or functionality of the various previous embodiments may be implemented. As shown, a system 800 is provided including at least one central processor 801 that is connected to a communication bus 802. The communication bus 802 may be implemented using any suitable protocol, such as PCI (Peripheral Component Interconnect), PCI-Express, AGP (Accelerated Graphics Port), HyperTransport, or any other bus or point-to-point communication protocol(s). The system 800 also includes a main memory 804. Control logic (software) and data are stored in the main memory 804 which may take the form of random access memory (RAM).

The system 800 also includes input devices 812, a graphics processor 806, and a display 808, i.e. a conventional CRT (cathode ray tube), LCD (liquid crystal display), LED (light emitting diode), plasma display or the like. User input may be received from the input devices 812, e.g., keyboard, mouse, touchpad, microphone, and the like. In one embodiment, the graphics processor 806 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 800 may also include a secondary storage 810. The secondary storage 810 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 804 and/or the secondary storage 810. Such computer programs, when executed, enable the system 800 to perform various functions. The memory 804, the storage 810, and/or any other storage are possible examples of computer-readable media.

In one embodiment, the architecture and/or functionality of the various previous figures may be implemented in the context of the central processor 801, the graphics processor 806, an integrated circuit (not shown) that is capable of at least a portion of the capabilities of both the central processor 801 and the graphics processor 806, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 800 may take the form of a desktop computer, laptop computer, server, workstation, game consoles, embedded system, and/or any other type of logic. Still yet, the system 800 may take the form of various other devices including, but not limited to a personal digital assistant (PDA) device, a mobile phone device, a television, etc.

Further, while not shown, the system 800 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
    generating a first task data structure for a first task in a memory;
    generating a second task data structure in the memory, wherein the second task data structure is a placeholder for a second task that is dependent on the first task;
    storing a pointer to the second task data structure in a first output dependence field of the first task data structure;
    setting a reference counter field of the second task data structure to an initial value that indicates a number of dependencies associated with the second task; and
    launching the second task when the reference counter field stores a particular value,
    wherein each task data structure comprises a reference counter field, one or more output dependence fields, and a task meta data (TMD) pointer field, and
    wherein the initial value of the reference counter field of the second task data structure is set to prevent the second task from being launched until the second task is generated in the memory and the TMD pointer field of the second task data structure is initialized to null to indicate that the second task has not been generated at the time of initialization.

2. The method of claim 1, wherein the particular value is zero.

3. The method of claim 1, further comprising generating the second task in the memory and linking the second task to the second task data structure by storing a pointer to a TMD data structure for the second task in the second task data structure.

4. The method of claim 3, further comprising generating a third task data structure in the memory, wherein the third task data structure is a placeholder for a third task that is dependent on the second task, wherein the initial value of the reference counter field of the third task data structure is set to prevent the third task from being launched until the third task is generated in the memory and the TMD pointer field of the third task data structure is initialized to null to indicate that the third task has not been generated at the time of initialization.

5. The method of claim 1, further comprising:
    launching the first task; and
    decrementing the reference counter field of the second task data structure when execution of the first task has completed.

6. The method of claim 1, wherein software generates a task meta data (TMD) data structure in the memory for each task, and each TMD data structure includes a pointer to a program kernel and one or more pointers to data to be processed by the program kernel.

7. The method of claim 1, wherein the first task data structure and the second task data structure are associated with a first stream, and further comprising:
    generating a third task data structure for a third task in the memory,
    generating a fourth task data structure in the memory,
    wherein the fourth task data structure is a placeholder for a fourth task that is dependent on the third task,
    wherein the initial value of the reference counter field of the fourth task data structure is set to prevent the fourth task from being launched until the fourth task is generated in the memory and the TMD pointer field of the fourth task data structure is initialized to null to indicate that the fourth task has not been generated at the time of initialization, and
    wherein the third task data structure and the fourth task data structure are associated with a second stream.

8. The method of claim 7, further comprising:
    generating a record event in the memory and linking the record event to the second task data structure; and
    generating a first wait event data structure in the memory and linking the record event to the first wait event data structure,
    wherein the first wait event data structure is a placeholder for a first wait event.

9. The method of claim 8, further comprising:
    generating the first wait event and linking the first wait event to the first wait event data structure;
    generating a second wait event data structure in the memory and linking the first wait event data structure to the second wait event data structure, wherein the second wait event data structure is a placeholder for a second wait event;
    linking the first wait event data structure to the fourth task data structure to synchronize the execution of the fourth task in the second stream with the occurrence of the record event in the first stream; and
    incrementing the reference counter field of the fourth task data structure.

10. The method of claim 8, further comprising:
    releasing a semaphore associated with the record event when the record event has completed execution.

11. The method of claim 7, further comprising:
    linking the second task data structure to a null task that indicates the end of the first stream; and
    releasing a semaphore associated with the second task data structure to indicate completion of the first stream.

12. The method of claim 7, further comprising transmitting an idle message to a host unit when both the first stream and the second stream have completed execution.

13. A non-transitory computer-readable storage medium storing instructions that, when executed by a processor, cause the processor to perform steps comprising:
    generating a first task data structure for a first task in a memory;
    generating a second task data structure in the memory, wherein the second task data structure is a placeholder for a second task that is dependent on the first task;
    storing a pointer to the second task data structure in a first output dependence field of the first task data structure;
    setting a reference counter field of the second task data structure to an initial value that indicates a number of dependencies associated with the second task; and
    launching the second task when the reference counter field stores a particular value, wherein each task data structure comprises a reference counter field, one or more output dependence fields, and a task meta data (TMD) pointer field, and wherein the initial value of the reference counter field of the second task data structure is set to prevent the second task from being launched until the second task is generated in the memory and the TMD pointer field of the second task data structure is initialized to null to indicate that the second task has not been generated at the time of initialization.

14. The non-transitory computer-readable storage medium of claim 13, the steps further comprising generating the second task in the memory and linking the second task to the second task data structure by storing a pointer to a TMD data structure for the second task in the second task data structure.

15. The non-transitory computer-readable storage medium of claim 13, the steps further comprising:
   launching the first task; and
   decrementing the reference counter field of the second task data structure when execution of the first task has completed.

16. A system, comprising:
   a memory; and
   a processor including a task management unit configured to:
      generate a first task data structure for a first task in the memory,
      generate a second task data structure in the memory, wherein the second task data structure is a placeholder for a second task that is dependent on the first task,
      store a pointer to the second task data structure in a first output dependence field of the first task data structure,
      set a reference counter field of the second task data structure to an initial value that indicates a number of dependencies associated with the second task, and
      launch the second task when the reference counter field stores a particular value, wherein each task data structure comprises a reference counter field, one or more output dependence fields, and a task meta data (TMD) pointer field, and wherein the second task data structure is a placeholder for the second task that is dependent on the first task, wherein the initial value of the reference counter field of the second task data structure is set to prevent the second task from being launched until the second task is generated in the memory and the TMD pointer field of the second task data structure is initialized to null to indicate that the second task has not been generated at the time of initialization.

17. The system of claim 16, the task management unit further configured to:
   launch the first task; and
   decrement the reference counter field of the second task data structure when execution of the first task has completed.

18. The system of claim 16, wherein the task management unit includes a task-dependence resolution unit and a schedule and launch unit, and wherein the task-dependence resolution unit is configured to:
   determine whether any pending tasks are associated with a reference counter field that store the particular value; and
   if at least one pending task is associated with a reference counter field that stores the particular value, then transmit the at least one pending task to the schedule and launch unit to be transmitted to a streaming multi-processor unit of the processor.

19. The system of claim 16, the processor further comprising a host interface unit coupled to the task management unit.

20. The system of claim 16, wherein the processor comprises a graphics processing unit.

* * * * *